United States Patent
Levin et al.

(10) Patent No.: US 10,226,984 B2
(45) Date of Patent: Mar. 12, 2019

(54) AIR-CONDITIONING SYSTEM WITH VACUUM ENCLOSURE

(71) Applicant: FORD GLOBAL TECHNOLOGIES, LLC, Dearborn, MI (US)

(72) Inventors: Michael Levin, Ann Arbor, MI (US); Furqan Zafar Shaikh, Troy, MI (US); Danrich Henry Demitroff, Okemos, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 727 days.

(21) Appl. No.: 14/683,627

(22) Filed: Apr. 10, 2015

(65) Prior Publication Data

US 2016/0297281 A1    Oct. 13, 2016

(51) Int. Cl.
*B60H 1/32*    (2006.01)

(52) U.S. Cl.
CPC .................. *B60H 1/3201* (2013.01)

(58) Field of Classification Search
None
See application file for complete search history.

(56) References Cited

U.S. PATENT DOCUMENTS

| | | | | |
|---|---|---|---|---|
| 7,143,589 | B2 * | 12/2006 | Smith | B60H 1/3201 62/238.3 |
| 8,099,969 | B2 | 1/2012 | Henning et al. | |
| 8,511,111 | B2 | 8/2013 | Lambert et al. | |
| 2006/0101847 | A1 * | 5/2006 | Henning | F25B 17/08 62/480 |
| 2013/0205822 | A1 * | 8/2013 | Heiland | H05K 7/2079 62/259.2 |
| 2014/0047853 | A1 | 2/2014 | Zhong et al. | |
| 2014/0053579 | A1 | 2/2014 | Shaikh et al. | |

FOREIGN PATENT DOCUMENTS

| | | |
|---|---|---|
| JP | 2014001876 A | 1/2014 |
| WO | 2004094928 A1 | 11/2004 |

OTHER PUBLICATIONS

English machine translation JP2014001876.
D. Magnetto; "Thermally Operated Mobile Air Conditioning Systems"; TOPMACS Consortium; dated Mar. 1, 2005, pp. 1-53.

* cited by examiner

*Primary Examiner* — Jianying Atkisson
*Assistant Examiner* — Nicholas R Hector
(74) *Attorney, Agent, or Firm* — Vichit Chea; King & Schickli, PLLC

(57) ABSTRACT

An air-conditioning system is provided for a motor vehicle. That system includes a vacuum enclosure having a refrigerant, a first section and a second section. The system further includes a radiator, a core and a phase change material vessel downstream from the core. A conduit and valve system operate the air-conditioning system in two modes of operation.

5 Claims, 3 Drawing Sheets

AIR-CONDITIONING SYSTEM WITH VACUUM ENCLOSURE

TECHNICAL FIELD

This document relates generally to the motor vehicle field and, more particularly, to an air-conditioning system for a motor vehicle that incorporates a vacuum enclosure with a single adsorption bed.

BACKGROUND

This document relates to a new and improved air-conditioning system that allows for both improved driver comfort as well as improved fuel economy when the air-conditioning system is in use. The air-conditioning system accomplishes this by reducing or eliminating AC accessory loads produced by conventional compressor-driven AC systems and by allowing immediate delivery of cold air for passenger comfort at or prior to engine start with available remotely activated preconditioning of the cabin air.

SUMMARY

In accordance with the purposes and benefits described herein, an air-conditioning system is provided for a motor vehicle. That air-conditioning system comprises a vacuum enclosure including a refrigerant, a first section and a second section. The air-conditioning system also includes a radiator, a core and a vessel, including a phase change material, downstream from the core. Further, the air-conditioning system includes a conduit and valve system whereby (a) a first heat exchange fluid is circulated through the radiator and the first section and a second heat exchange fluid is circulated through the second section, the core and the vessel in a first mode of operation and (b) the first heat exchange fluid is circulated through the radiator and the second section and the second heat exchange fluid is circulated through the core and the vessel in a second mode of operation.

More specifically, the first section includes an adsorption bed for adsorbing refrigerant vapor and a heat exchange conduit for circulating the first heat exchange fluid through the absorption bed in the first mode of operation.

In one possible embodiment, the adsorption bed includes a plurality of desiccant coated plates. Further, the heat exchange conduit includes an inlet end and an outlet end and the conduit and valve system includes a first valve at the inlet end and a second valve at the outlet end.

The second section includes a refrigerant evaporator/condenser and a heat exchange fluid conduit for circulating the second heat exchange fluid through the evaporator/condenser in the first mode of operation and the first heat exchange fluid through the evaporator/condenser in the second mode of operation. The heat exchange fluid conduit further includes an inlet and an outlet and the conduit and valve system includes a third valve at the inlet and a fourth valve at the outlet.

In addition, the conduit and valve system includes a fifth valve upstream of the core and a sixth valve downstream of the vessel. A first heat exchange fluid pump is provided between the radiator and the vacuum enclosure and a second heat exchange fluid pump is provided between the fifth valve and the core.

In addition, the air-conditioning system includes a heat recovery circuit. That heat recovery circuit includes an exhaust gas heat exchanger, a third heat exchange fluid pump and a third heat exchange fluid circulated through the exhaust gas heat exchanger to capture heat. The conduit and valve system circulates the third heat exchange fluid from the exhaust gas heat recovery circuit through the heat exchange conduit of the first section in the second mode of operation in order to heat the refrigerant and desorb the adsorber. In one possible embodiment, the exhaust gas heat recovery circuit further includes a second vessel containing a second phase change material for storing heat.

In accordance with an additional aspect, a method is provided for a vehicle climate control system. That method may be broadly described as comprising the steps of (a) circulating a first heat exchange fluid through a radiator and an adsorber section of a vacuum enclosure and a second heat exchange fluid through an evaporator/condenser section of the vacuum enclosure, a core and a phase change material vessel in a first operation mode and (b) circulating the first heat exchange fluid through the radiator and the evaporator/condenser and the second heat exchange fluid through the core and the phase change material vessel in a second operation mode.

The method may further include the step of circulating a third heat exchange fluid from an exhaust gas heat recovery circuit through the adsorbent section of the vacuum enclosure in the second operation mode in order to heat refrigerant and desorb the adsorber section. Further, the method may include circulating the third heat exchange fluid through an exhaust gas heat exchanger and a second phase change material vessel.

In addition, the method may include circulating air to be conditioned in heat exchange relationship with the second heat exchange fluid. Further, the method includes providing an air-conditioning system with only a single adsorber section. Still further, the method includes providing a single vacuum enclosure with an adsorber section open to the evaporator/condenser section wherein the adsorber section stores refrigerant vapor removed from the evaporator/condenser section during the first mode of operation and the evaporator/condenser section stores refrigerant liquid released from the adsorber section during the second mode of operation. In one possible embodiment, the method includes cycling between the first operation mode and the second operation mode every 3 to 12 minutes. Further, the method includes cooling the adsorber section during the first operation mode so as to provide an absolute pressure inside the vacuum enclosure of between about 0.5 to about 1.0 kPa. Further, the method includes heating the adsorber section during the second operation mode so as to provide an absolute pressure inside the vacuum enclosure of between about 10 to about 14 kPa.

In the following description, there are shown and described several preferred embodiments of the air-conditioning system and the related method for a vehicle climate control system. As it should be realized, the air-conditioning system and method are capable of other, different embodiments and their several details are capable of modification in various, obvious aspects all without departing from the air-conditioning system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the air-conditioning system and together with the description serve to explain certain principles thereof. In the drawing figures.

Reference will now be made in detail to the present preferred embodiments of the air-conditioning system and the related method, examples of which are illustrated in the accompanying drawing figures.

DETAILED DESCRIPTION

Figure 1:
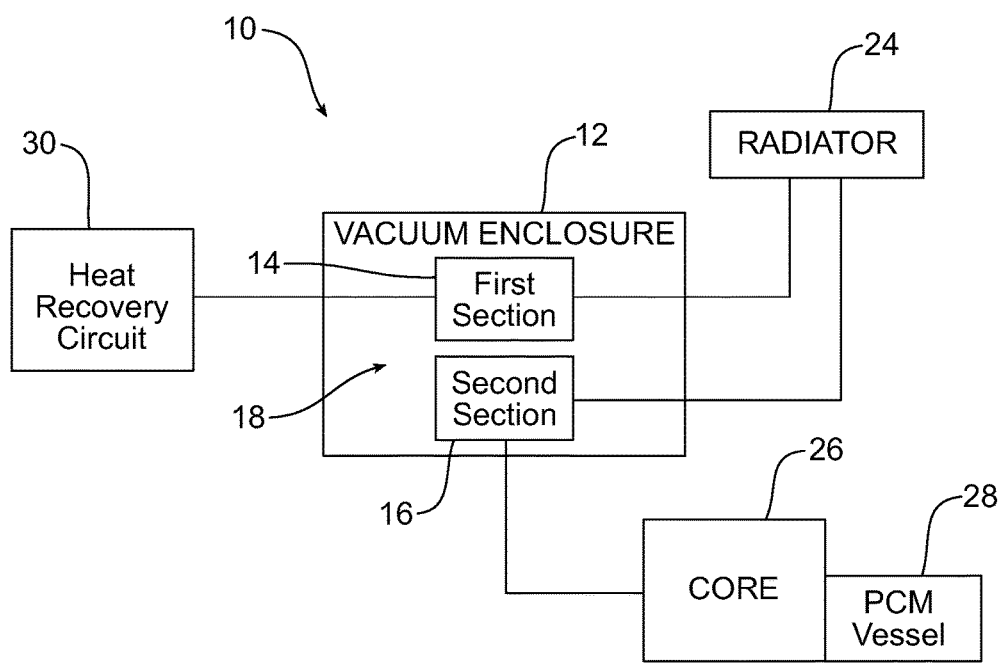
FIG. 1 is a schematic block diagram of the air-conditioning system.

Reference is now made to FIG. 1 which schematically illustrates the air-conditioning system 10 that is the subject matter of this document. That air-conditioning system 10 includes a vacuum enclosure 12, a first section 14, a second section 16 and a refrigerant 18. The first section 14, second section 16, and the refrigerant 18 are all held in the vacuum enclosure 12.

Figure 2:
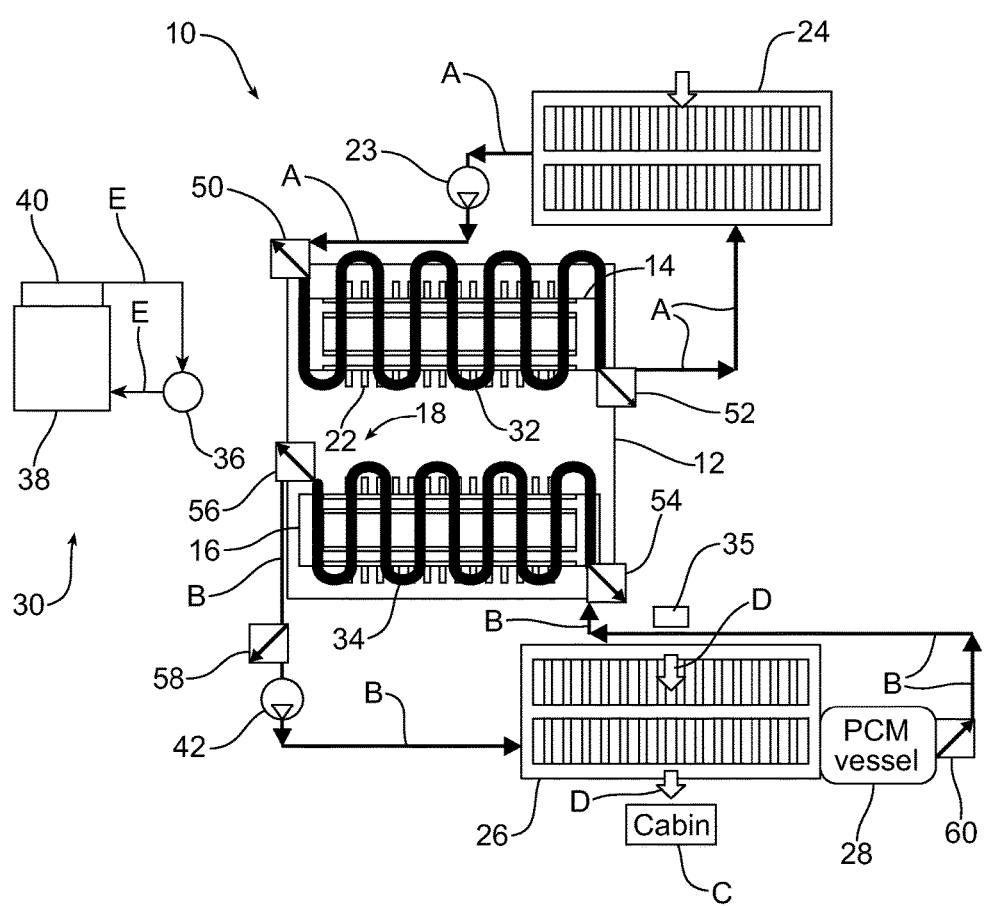
FIG. 2 is a schematic block diagram illustrating the air-conditioning system operating in the first or adsorption/evaporation mode of operation.

More specifically, the first section 14 comprises an adsorption bed for adsorbing and storing refrigerant vapor. That adsorption bed 14 may comprise, for example, a plurality of desiccant coated plates 22 (see FIGS. 2 and 3). The desiccant type may be a zeolite or a metal organic framework (MOF). Of course, other desiccant types appropriate for this for this purpose could be used if desired.

The second section 16 comprises a refrigerant evaporator/condenser which functions as a liquid refrigerant storage device and depending upon the enclosure pressure and temperature, condenses vapor or evaporates liquid. As will be apparent from the following description, the refrigerant 18 goes back and forth as a vapor and a liquid between the first section or adsorption bed 14 and the second section or evaporator/condenser 16. The first and second sections 14, 16 in the vacuum enclosure 12 are not separated by any partition wall in order to minimize resistance to vapor flow. In one possible embodiment, refrigerant 18 is water which has a high latent heat of evaporation. However, it should be appreciative that other refrigerants could also be used. Those other refrigerants include, but are not necessarily limited to, ammonia, methanol/water or commonly used automotive refrigerants like R1234yf.

As further illustrated in FIG. 1, the air-conditioning system 10 includes a radiator 24 which effectively replaces the condenser in a state-of-the-art vehicle air-conditioning system and a core 26 that effectively replaces the evaporator in a state-of-the-art vehicle air-conditioning system. As further illustrated, a phase change material (PCM) vessel 28 is provided downstream from the core 26. Still further, the air-conditioning system 10 includes a heat recovery circuit, generally designated by reference number 30, that will be described in greater detail below.

The air-conditioning system 10 includes two modes of operation. In the first or adsorption/evaporation mode of operation illustrated in FIG. 2, a first heat exchange fluid is circulated by the pump 23 from the radiator 24, where it is cooled, through the heat exchange conduit 32 in heat exchange relationship with the first section/adsorber 14 thereby cooling the adsorber to remove the heat of adsorption (note action arrows A). The cooling of the first section/adsorber 14 reduces the absolute pressure inside the vacuum enclosure 12 to approximately 0.5-1.0 kPa range. This enables the desiccant coated plates 22 of the adsorption bed 14 to draw and store refrigerant vapor.

The reduction of the pressure inside the vacuum enclosure 12 to the saturation pressure level of the liquid refrigerant 18 and the vapor suctioned by the adsorption bed 14 produce intense evaporation (boiling) of the film of liquid refrigerant 18 on the surfaces of the plates of the second section or evaporator/condenser 16. The refrigerant vapor generated in the vacuum enclosure 12 is transported to and stored on the plates 22.

During this first mode of operation, a second heat exchange fluid is circulated by the pump 42 through the heat exchange conduit 34 of the second section or evaporator/condenser 16, the core 26 and the PCM vessel 28 (note action arrows B). As a result, the core 26 is cooled to approximately 5°-7° C. temperature range for heat exchange with air being circulated through the motor vehicle passenger cabin C by the blower 35 (note action arrows D). As a result that air is cooled and dehumidified. The second heat exchange fluid is then circulated to the PCM vessel 28 where it serves to freeze the phase change material in that vessel. That vessel 28 may, for example, be made of a shell-and-tube construction with the phase change material filling the tubes and the refrigerant flowing on the shell side. The heat insulation could be of a dual-wall vacuum-gap type. Alternatively, or in addition, the PCM vessel 28 could be wrapped with vacuum insulation panel (VIP) material. The PCM vessel 28 would typically contain 2-4 kg of phase change material with the latent heat in the 150-350 kJ/kg range and a melting point in the 8°-10° C. temperature range.

In the illustrated embodiment, the PCM vessel 28 is located downstream of the core 26. It should be appreciated that the PCM vessel 28 could, alternatively, be located upstream of the core 26 depending upon particular thermal management requirements. When placed upstream, less or no reheating of air may be required, as the heat exchange fluid entering the core would be warmer having received some heat from the phase change material.

In winter or at other appropriate times, the air coming from the core 26 could be directed to a separate heater core (not shown) before it enters the cabin in order to raise the air temperature to the level of comfort desired by the occupants.

The core 26 may be constructed similar to automotive heater cores commonly used for cabin heating. The HVAC blower fan 35 forces air through the core 26 in heat exchange relationship with the circulating second refrigerant and then into the vehicle cabin C to provide cooling for the vehicle occupants.

During the first mode of operation, the pump 36 circulates the third refrigerant fluid in a closed exhaust gas heat recovery circuit 30 between the exhaust gas heat exchanger 38 and the PCM vessel 40 in order to store heat in the phase change material held in that vessel (note action arrows E).

Figure 3:
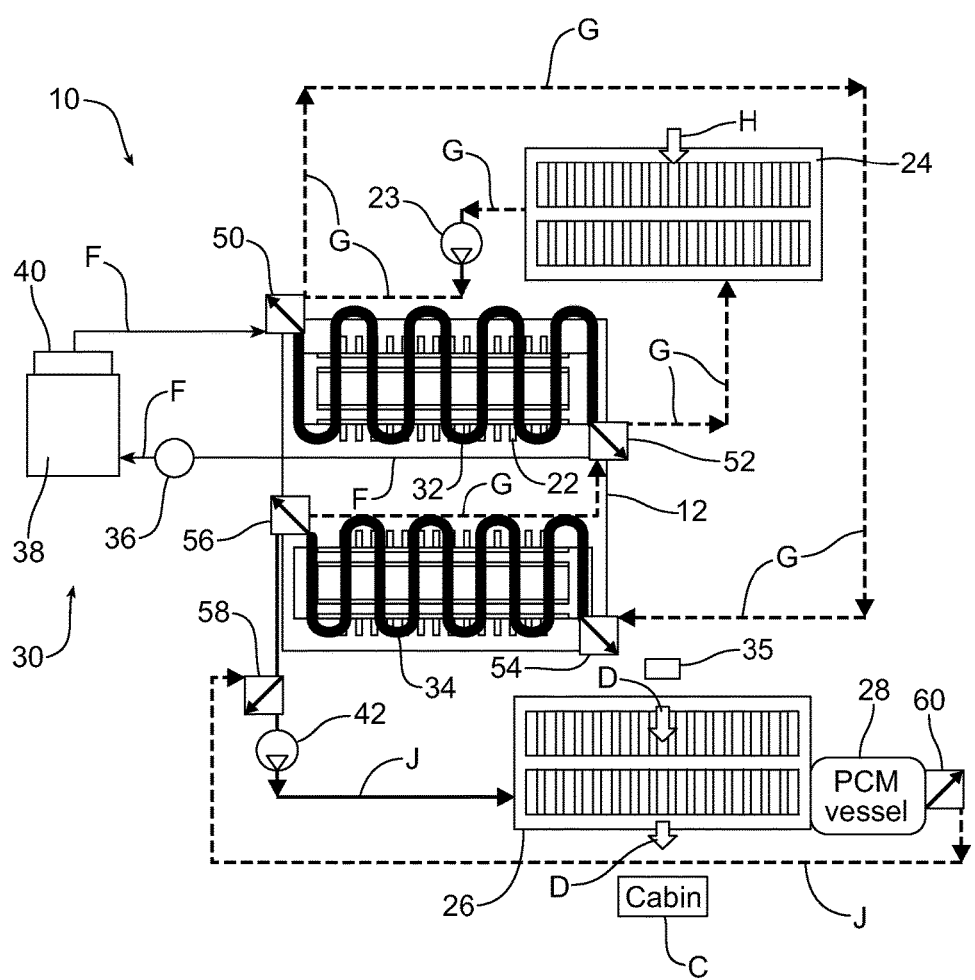
FIG. 3 is a schematic block diagram illustrating the air-conditioning system operating in the second or desorption/condensation mode of operation.

In the second or desorption/condensation mode of operation illustrated in FIG. 3, the heated third refrigerant is circulated between the heat exchange conduit 32 of the first section/adsorber 14 and the heat recovery circuit 30 (see action arrows F). The heat from the third exchange fluid causes the absolute pressure in the vacuum enclosure 12 to rise to approximately 10-14 kPa and the adsorption bed 14 to expel refrigerant vapor that condenses on the surfaces of the plates of the second section or evaporator/condenser 16. Simultaneously, the heat of condensation is removed from the second section or evaporator/condenser 16 by the circulation of the first heat exchange fluid between the heat exchange conduit 34 of the second section 16 and the radiator 24 (note action arrows G) where that heat is rejected to the environment by ambient air (note action arrow H) through the radiator.

As further illustrated in FIG. 3, in this second mode of operation, the second heat exchange fluid is circulated by the pump 42 to the core 26 and PCM vessel 28 (note action arrows J). More specifically, the frozen phase change material in the PCM vessel 28 cools the refrigerant which is then delivered to the core 26. There the blower fan 35 pushes air (note action arrows D) through the core 26 in heat exchange relationship with the refrigerant thereby cooling the air which is then delivered to the vehicle cabin C. As should be appreciated, this allows the uninterrupted delivery of cold air to the cabin while the adsorption bed 14 is regenerated to be ready for the next adsorption/evaporation mode of the operation cycle. In one possible embodiment, the air-conditioning system 10 cycles between operating modes every 3 to 12 minutes with the time range being adjusted based on various demand profiles for cooling the cabin and to maximize the frozen phase change material fraction. This is necessary to maximize the vehicle parking time with the "instant cold" availability at the next vehicle start. Of course, it should also be appreciated that the "instant cold" availability time may be extended by increasing the amount of the phase change material held in the vessel 28, using a phase change material type of a higher latent heat and/or improving the vessel insulation.

A conduit and valve system includes six valves 50, 52, 54, 56, 58, 60 to control the flow of the three different refrigerant fluids as the air-conditioning system 10 cycles through the first and second modes of operation. The first valve 50 is provided at the inlet end of the first section heat exchange conduit 32 while the second valve 52 is provided at the outlet end of that conduit. The third valve 54 is provided at the inlet end of the second section heat exchange conduit 34 while the fourth valve 56 is provided at the outlet end of that conduit. Finally the fifth valve 58 is provided upstream of the core 26 while the sixth valve 50 is provided downstream of the PCM vessel 28.

In summary, numerous benefits are provided by the air-conditioning system 10. As should be appreciated, the radiator 24 effectively replaces the air-conditioning condenser used in a state-of-the-art compressor-driven vehicle air-conditioning system while the core 26 effectively replaces the state-of-the-art evaporator. This eliminates AC accessory loads produced by conventional compressor driven AC systems thereby increasing engine power and fuel economy. Further, by storing heat in the phase change material in the PCM vessel 40 and cold in the phase change material on the PCM vessel 28, the air-conditioning system 10 provides instant heating or cooling as desired to remotely precondition the air in the passenger cabin C prior to engine start.

The air-conditioning system 10 functions to provide a simple and efficient method for vehicle climate control which may be broadly described as comprising the steps of circulating a first heat exchange fluid through the radiator 24 and the first or adsorber section 14 of a vacuum enclosure 12 and a second heat exchange fluid through a second or evaporator/condenser section 16 (in the same vacuum enclosure 12), the core 26 and the phase change material vessel 28 in the first mode of operation. In contrast, in a second mode of operation, the method includes circulating the first heat exchange fluid through the radiator 24 and the second or evaporator/condenser section 16 and the second heat exchange fluid through the core 26 and the phase change material vessel 28.

The method further includes circulating a third heat exchange fluid from the exhaust gas heat recovery circuit 30 through the first or adsorber section 14 of the vacuum enclosure 12 in the second mode of operation in order to heat the refrigerant 18 and desorb the adsorber section. As described, that third heat exchange fluid is continuously circulated through the exhaust gas heat exchanger 38 and a second phase change material vessel 40 by means of the pump 36 in order to store heat in the phase change material within the vessel 40.

As also previously described, the method includes circulating air to be conditioned through the core 26 in heat exchange relationship with the second heat exchange fluid.

Advantageously, the air-conditioning system 10 has only a single adsorber section 14 which provides substantial weight and space savings over prior art adsorber based air-conditioning systems that include multiple adsorber sections. As also disclosed, the air-conditioning system 10 includes only a single vacuum enclosure 12 wherein the adsorber section 14 is open to an evaporator/condenser section 16 so as to always operate at maximum efficiency. As a result, the air-conditioning system 10 can more efficiently and effectively cool the motor vehicle cabin C for the vehicle occupants while simultaneously allowing the vehicle to be operated with greater fuel economy.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An air conditioning system for a motor vehicle, comprising:
a vacuum enclosure including a refrigerant, a first section and a second section;
a radiator;
a core;
a vessel including a phase change material downstream from said core; and
a conduit and valve system whereby (a) in a first mode of operation, a first heat exchange fluid is circulated through said radiator and said first section, and a second heat exchange fluid is circulated through said second section, said core and said vessel; and (b) in a second mode of operation, said first heat exchange fluid is circulated through said radiator and said second section and said second heat exchange fluid is circulated through said core and said vessel,
wherein said first section includes an adsorption bed having a plurality of desiccant coated plates for adsorbing refrigerant vapor and a heat exchange conduit for circulating said first heat exchange fluid through said adsorption bed in said first mode of operation, wherein said heat exchange conduit includes an inlet end and an outlet end and said conduit and valve system includes a first valve at said inlet end and a second valve at said outlet end,
wherein said second section includes a refrigerant evaporator/condenser and a second heat exchange fluid conduit for circulating said second heat exchange fluid through said evaporator/condenser in said first mode of operation and said first heat exchange fluid through said evaporator/condenser in said second mode of operation, wherein said second heat exchange fluid conduit includes a second inlet and a second outlet and said conduit and valve system includes a third valve at said second inlet and a fourth valve at said second outlet, and wherein said conduit and valve system includes a fifth valve upstream of said core and a sixth valve downstream of said vessel.

2. The system of claim 1, including a first heat exchange fluid pump between said radiator and said vacuum enclosure and a second heat exchange fluid pump between said fifth valve and said core.

3. The system of claim 1, further including a heat recovery circuit including an exhaust gas heat exchanger, a third heat exchange fluid pump and a third heat exchange fluid circulated through said exhaust gas heat exchanger to capture heat.

4. The system of claim 3, wherein said conduit and valve system circulates said third heat exchange fluid from said heat recovery circuit through said heat exchange conduit of said first section in said second mode of operation in order to heat said refrigerant and desorb said adsorber.

5. The system of claim 4, wherein said heat recovery circuit includes a second vessel containing a second phase change material for storing heat.

\* \* \* \* \*